(12) United States Patent
Lilly

(10) Patent No.: US 6,829,355 B2
(45) Date of Patent: Dec. 7, 2004

(54) DEVICE FOR AND METHOD OF ONE-WAY CRYPTOGRAPHIC HASHING

(75) Inventor: Glenn M. Lilly, Sykesville, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 822 days.

(21) Appl. No.: 09/799,432

(22) Filed: Mar. 5, 2001

(65) Prior Publication Data
US 2002/0122554 A1 Sep. 5, 2002

(51) Int. Cl.[7] .............................. H04L 9/00; H04L 9/28; H04H 9/00; G06F 7/00
(52) U.S. Cl. .............................. 380/28; 380/30; 380/46; 380/37; 380/42; 380/262; 380/255; 713/189; 713/192; 713/200; 713/180; 711/216
(58) Field of Search .............................. 380/28, 46, 30, 380/37, 42, 262, 255; 713/189, 192, 200, 168, 180; 711/216

(56) References Cited

U.S. PATENT DOCUMENTS

| | | | |
|---|---|---|---|
| 5,606,616 A | | 2/1997 | Sprunk et al. |
| 5,608,801 A | * | 3/1997 | Aiello et al. ................. 380/46 |
| 5,892,829 A | * | 4/1999 | Aiello et al. ................. 713/180 |
| 6,021,201 A | | 2/2000 | Bakhle et al. |
| 6,141,421 A | * | 10/2000 | Takaragi et al. ............... 380/30 |
| 6,307,938 B1 | * | 10/2001 | Matyas et al. ................. 380/44 |
| 6,370,247 B1 | * | 4/2002 | Takaragi et al. ............... 380/28 |
| 6,408,273 B1 | * | 6/2002 | Quagliaro et al. .......... 704/271 |

OTHER PUBLICATIONS

Bruce Schneier, "Applied Cryptography, 2nd. ed.", John Wiley & Sons, New York, 1996, pps. 429–459.
FIPS POB 180–1, Secure Hash Standard, Apr. 17, 1995, pps. 1–16.

* cited by examiner

Primary Examiner—Ly V. Hua
(74) Attorney, Agent, or Firm—Robert D. Morelli

(57) ABSTRACT

The present invention is a device for and method of generating a hash value for a message by padding the message, loading the padded message into a first shift register that generates values according to a first rule of motion, initializing eight registers a, b, c, d, e, f, g, and h with user-definable values; converting the contents of the registers to $h_j = g_{j-1}$; $g_j = f_{j-1}$; $f_j = e_{j-1}$; $e_j = d_{j-1} + T_1$, where $T_1 = h_{j-1} + \Sigma_1(e_{j-1}) + Ch(e_{j-1}, f_{j-1}, g_{j-1}) + K_j + W_j$; $d_j = c_{j-1}$; $c_j = b_{j-1}$; $b_j = a_{j-1}$; and $a_j = T_1 + T_2$, where $T_2 = \Sigma_0(a_{j-1}) + Maj(a_{j-1}, b_{j-1}, c_{j-1})$; computing $H_1(j) = a + H_1(j-1)$; $H_2(j) = b + H_2(j-1)$; $H_3(j) = c + H_3(j-1)$; $H_4(j) = d + H_4(j-1)$; $H_5(j) = e + H_5(j-1)$; $H_6(j) = f + H_6(j-1)$; $H_7(j) = g + H_7(j-1)$; and $H_8(j) = h + H_8(j-1)$; and either performing additional conversions of the registers or returning ($H_1(j)$, $H_2(j)$, $H_3(j)$, $H_4(j)$, $H_5(j)$, $H_6(j)$, $H_7(j)$, $H_8(j)$) as the hash value of the message.

19 Claims, 2 Drawing Sheets

DEVICE FOR AND METHOD OF ONE-WAY CRYPTOGRAPHIC HASHING

FIELD OF THE INVENTION

The present invention relates, in general, to cryptography and, in particular, to block/data stream enciphering.

BACKGROUND OF THE INVENTION

An n-bit hash function produces an n-bit hash value from an input of arbitrary length. An n-bit cryptographic hash function is a one-way n-bit hash function that is collision-resistant. A one-way cryptographic hash function is one that requires $2^n$ hash computations to be performed before an input is found that produces a given hash value from a given hash function. Collision-resistance indicates that about $2^{(n/2)}$ hash computations must be performed before two different inputs are found that produce the same have value. The collision-resistance factor is taken as the amount of security provided by the hash function.

Presently, the only one-way cryptographic hash function approved by the National Institute of Standards and Technology (NIST) is SHA-1 which is disclosed in Federal Information Processing Standards Publication 180-1 (FIPS PUB 180-1), entitled "Secure Hash Standard." FIPS PUB 180-1 is hereby incorporated by reference into the specification of the present invention.

SHA-1 produces a 160-bit hash value with a corresponding collision resistance of $2^{(160/2)}$, whereas MD4 and MD5 each produce a 128-bit hash value with a corresponding collision resistance of $2^{(128/2)}$.

NIST requires a one-way cryptographic hash function with 128, 192, and 256 bits of security to go along with three versions of its proposed Advanced Encryption Standard (AES). The present invention is in response to this requirement.

U.S. Pat. No. 5,606,616, entitled "CRYPTOGRAPHIC APPARATUS WITH DOUBLE FEEDFORWARD HASH FUNCTION," discloses, amongst other things, a device that uses a 64-bit DES algorithm to produce a hash value. Since the hash value is, effectively, 56 bits long, the cryptographic strength of this hash function is no more than $2^{(56/2)}$. This hash function is not adequate for use with AES and does not disclose the one-way cryptographic hash function of the present invention. U.S. Pat. No. 5,606,616 is hereby incorporated by reference into the specification of the present invention.

U.S. Pat. No. 5,892,829, entitled "METHOD AND APPARATUS FOR GENERATING SECURE HASH FUNCTIONS," discloses a device for and a method of dividing a string to be hashed into a number of blocks and hashing each block along with another value using an existing hash algorithm such as MD4, MD5, SHA-1, or DES. U.S. Pat. No. 5,892,829 provides no more security than the hash function employed therein, none of which are suitable for use in AES. Furthermore, U.S. Pat. No. 5,892,829 does not disclose the one-way cryptographic hash function of the present invention. U.S. Pat. No. 5,892,829 is hereby incorporated by reference into the specification of the present invention.

U.S. Pat. No. 6,021,201, entitled "METHOD AND APPARATUS FOR INTEGRATED CIPHERING AND HASHING," discloses a device for and method of performing ciphering and hashing in parallel instead of in series. However, U.S. Pat. No. 6,021,201 uses existing hash functions for its hash function such as MD5 and SHA (now known as SHA-1) and does not disclose a new hash function as does the present invention. U.S. Pat. No. 6,021,201 is hereby incorporated by reference into the specification of the present invention.

SUMMARY OF THE INVENTION

It is an object of the present invention to hash a value in a one-way cryptographic manner.

It is another object of the present invention to hash a value in a manner that meets the security requirements of AES and is more secure than MD5 and SHA-1.

The present invention is a method of generating a hash value, or message digest, for a message. The first step is padding the message for which a hash value is desired so that the padded message has a bit length of 512m, where m is a user-definable positive integer. If m=1, the hash value generated is 256 bits. If m=2, the hash value is 512 bits.

The second step of the method is parsing the result of the first step into 16 32m-bit blocks $M_i$.

The third step of the method is generating j values $W_j$ from the parsed message of the second step.

The fourth step of the method is initializing eight blocks a, b, c, d, e, f, g, and h with user-definable values $H_1$, $H_2$, $H_3$, $H_4$, $H_5$, $H_6$, $H_7$, and $H_8$, respectively, where $H_1$–$H_8$ collectively represent the initial value for the hash value.

The fifth step of the method is converting the contents of a, b, c, d, e, f, g, and h.

The sixth step of the method is computing values that make up the hash value.

The seventh, and last, step of the method is either accepting a portion of the contents of $H_1(j)$–$H_8(j)$ as the hash value of the message or returning to the fifth step for another step of the second shift register.

The device of the present invention includes a user-definable number of registers, a first mod $2^n$ adder, a first nonlinear function block, a second nonlinear function block, a first shift function block, a second shift function block, a second mod $2^n$ adder, a third mod $2^n$ adder, a fourth mod $2^n$ adder, a fifth mod $2^n$ adder, a sixth mod $2^n$ adder, and an accumulator.

The device may also include a message-scheduler device that includes a user-definable number of registers, a third shift function block, a fourth shift function block, a seventh mod $2^n$ adder, an eighth mod $2^n$ adder, and a ninth mod $2^n$ adder.

The device of the present invention includes n 32m-bit blocks as a first shift register; a first function block $\sigma_0(x)$; a second function block $\sigma_1(x)$; a first logic block; a second logic block; a third logic block; a fourth logic block; p 32m-bit blocks connected as a second shift register; an accumulator; a third function block $\Sigma_0(x)$; a fourth function block $\Sigma_1(x)$; a fifth function block Maj(x); a sixth function block Ch (x); a sixth logic block; a seventh logic block; an eighth logic block; and a ninth logic block.

DETAILED DESCRIPTION

The present invention is a device for and method of generating a hash value, or message digest, for a message of length l that has a collision resistance greater than $2^{80}$. In two preferred embodiments, the present invention has collision resistance of 2^128 and 2^256, respectively. These two embodiments meet the requirements of NIST's Advanced Encryption Standard (AES).

Figure 1:
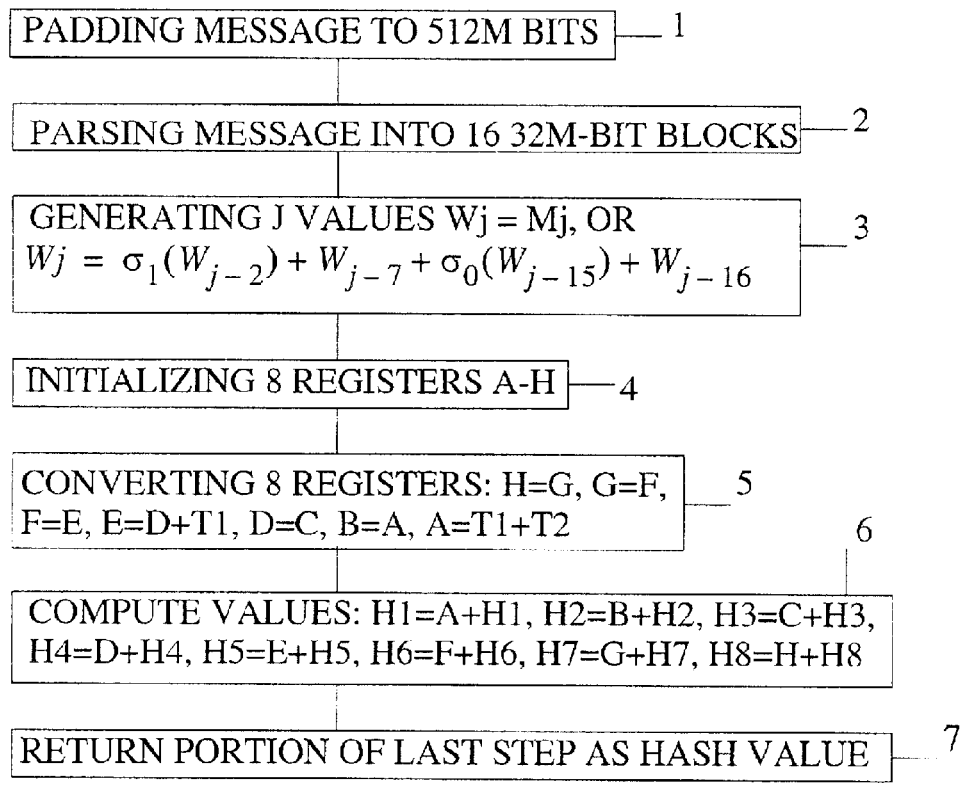
FIG. 1 is a list of the steps of the present invention.

FIG. 1 is a list of the steps of the present invention. The first step 1 of the method is padding the message to a bit length of 512m bits, where m is a user-definable positive integer. appending a 1 bit to the end of the message for which a hash value is desired. In the preferred embodiment, the message is appended with a 1 bit followed by k zero bits, where k is the smallest non-negative solution to l+1+k= (448m) mod (512m). Alternatively, the message may be pre-pended or appended with zero bits, one bits, or any combination thereof. The bits padded may include information as well (e.g., length of the message and/or padded bits). In the preferred embodiment, m is either 1 or 2. If m=1, the hash value generated by the present invention is 256 bits. If m=2, the hash value is 512 bits. Other hash lengths are also possible. In an alternate embodiment, a subset of a hash value generated by the present invention may be used as the final hash value. For example, 384 bits out of the 512-bit hash value generated when m=2 may be used in those situations when a 384-bit hash value is required. Generating a hash value of greater than 160 bits will result in a hash value having collision resistance greater than 2^80. This is greater than the collision resistance of SHA-1 which is, presently, the only hash function that is approved by NIST in a FIPS publication. In two preferred embodiments, the message is hashed to either 256 bits or 512 bits. The two embodiments result in collision resistance of 2^128 and 2^256, respectively, both of which meet the requirements of NIST's AES.

The second step 2 of the method is parsing the result of the first step 1 into 16 32m-bit blocks $M_i$. If m=1, indicating a 256-bit hash value, the padded message is parsed into 16 32-bit blocks. If m=2, indicating a 512-bit hash value, the padded message is parsed into 16 64-bit blocks.

The third step 3 of the method is generating j values $W_j$ from the parsed message of the second step 2 according to the following equations:

$$W_j = M_j \text{ for } j = 0, 1, \ldots, 15; \text{ and}$$

$$W_j = \sigma_1(W_{j-2}) + W_{j-7} + \sigma_0(W_{j-15}) + W_{j-16} \text{ for } j = 16, 17, \ldots, j,$$

where j is a user-definable positive integer,
where $\sigma_1(x) = S^{17}(x) \oplus S^{19}(x) \oplus R^{10}(x)$, if m=1;
where $\sigma_1(x) = S^{19}(x) \oplus S^{61}(x) \oplus R^6(x)$, if m=2;
where + is addition mod $2^{32m}$;
where $\oplus$ is bitwise XOR;
where $\sigma_0(x) = S^7(x) \oplus S^{18}(x) \oplus R^3(x)$, if m=1;
where $\sigma_0(x) = S^1(x) \oplus S^8(x) \oplus R^7(x)$, if m=2;
where $S^i(x)$ is a right rotation of the contents of block x by i bits, leaving block x unchanged afterwards; and
where $R^i(x)$ is a right shift of block x by i bits, leaving block x unchanged afterwards.

The equations of the third step 3 describe a linear sequence generator, where the 16 32m-bit blocks are connected as a shift register, and where various functions (i.e., addition and XOR) are performed on specified blocks and provided as feedback into the input of the first block in the shift register. The output of the last block in the shift register. In the preferred embodiment, the shift register shifts from right to left, and the blocks are numbered 0–15 from left to right. So, the first block into which feedback is received is block number 15, and the block from which values are produced per step, or clock cycle, of the shift register as described in the third step 3 is block number 0. In the preferred embodiment, the number of times the shift register is stepped (i.e., j) is 64 if m=1 (i.e., 256-bit hash) and 80 if m=2 (i.e., 512-bit hash).

The fourth step 4 of the method is initializing eight blocks a, b, c, d, e, f, g, and h with user-definable values $H_1$, $H_2$, $H_3$, $H_4$, $H_5$, $H_6$, $H_7$, and $H_8$, respectively, where $H_1$–$H_8$ collectively represent the initial value for the hash value. The eight blocks are represent components in a second shift register. Each step of the shift register produces an intermediate hash value. However, the blocks must be initialized to some user-definable starting point. The fourth step 4 provides such initialization.

The fifth step 5 of the method is converting the contents of a, b, c, d, e, f, g, and h as follows:

$$h_j = g_{j-1};$$

$$g_j = f_{j-1};$$

$$f_j = e_{j-1};$$

$$e_j = d_{j-1} + T_1, \text{ where } T_1 = h_{j-1} + \Sigma_1(e_{j-1}) + Ch(e_{j-1}, f_{j-1}, g_{j-1}) + K_j + W_j,$$

where $\Sigma_1(e_{j-1}) = S^6(e_{j-1}) \oplus S^{11}(e_{j-1}) \oplus S^{25}(e_{j-1})$ if m=1,
where $\Sigma_1(e_{j-1}) = S^{14}(e_{j-1}) \oplus S^{18}(e_{j-1}) \oplus S^{41}(e_{j-1})$ if m=2,
where $Ch(e_{j-1}, f_{j-1}, g_{j-1}) = (e_{j-1} \wedge f_{j-1}) \oplus (\neg e_{j-1} \wedge g_{j-1})$,
where $K_j$ is at least one key, where ^ is bitwise AND, and where ¬ is bitwise complement;

$$d_j = c_{j-1};$$

$$c_j = b_{j-1};$$

$$b_j = a_{j-1}; \text{ and}$$

$$a_j = T_1 + T_2, \text{ where } T_2 = \Sigma_0(a_{j-1}) + Maj(a_{j-1}, b_{j-1}, c_{j-1}),$$

where $\Sigma_0(a_{j-1}) = S^2(a_{j-1}) \oplus S^{13}(a_{j-1}) \oplus S^{22}(a_{j-1})$ for m=1,
where $\Sigma_0(a_{j-1}) = S^{28}(a_{j-1}) \oplus S^{34}(a_{j-1}) \oplus S^{39}(a_{j-1})$ for m=2,
and where $Maj(a_{j-1}, b_{j-1}, c_{j-1}) = (a_{j-1} \wedge b_{j-1}) \oplus (a_{j-1} \wedge c_{j-1}) \oplus (b_{j-1} \wedge c_{j-1})$.

The fifth step 5 describes the operation, or rule of motion, of the second shift register as it is stepped.

The sixth step 6 of the method is computing values that make up the hash value as follows:

$$H_1(j) = a + H_1(j-1);$$

$$H_2(j) = b + H_2(j-1);$$

$$H_3(j) = c + H_3(j-1);$$

$$H_4(j) = d + H_4(j-1);$$

$$H_5(j) = e + H_5(j-1);$$

$$H_6(j) = f + H_6(j-1);$$

$$H_7(j) = g + H_7(j-1); \text{ and}$$

$$H_8(j) = h + H_8(j-1);$$

The sixth step 6 indicates that after each step of the second register, the contents of blocks a–h are mod $2^{32m}$ added to the previous hash value contained in $H_1(j-1)$–$H_8(j-1)$.

The seventh, and last, step 7 of the method is either accepting at least 161 bits of the contents of $H_1(j)$–$H_8(j)$ as the hash value of the message or returning to the fifth step 5 for another step of the second shift register. Each step of the second register provides more scrambling of the message and, therefore, more collision resistance. In the preferred embodiment, the entire contents of $H_1(j)$–$H_8(j)$ is accepted as the hash value, and the second register is stepped a total of 64 times for m=1 (i.e., 256-bit hash) and 80 times for m=2 (i.e., 512-bit hash).

Figure 2:
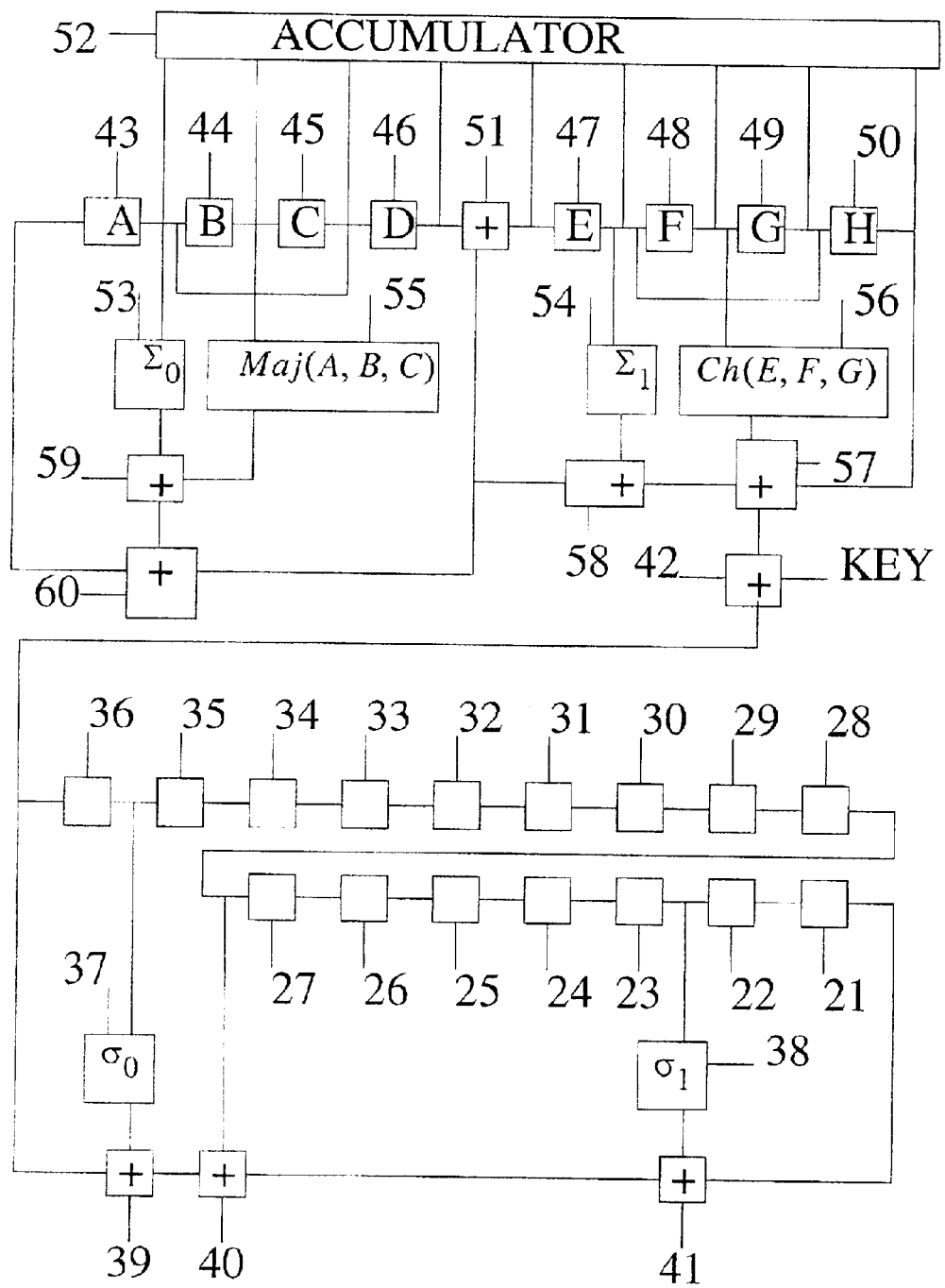
FIG. 2 is a block diagram of the present invention.

FIG. 2 is a block diagram of the preferred embodiment 20 of the present invention. FIG. 2 is only an example of one possible configuration of the present invention. Other configurations are possible. The device 20 for generating a hash value of a message includes n 32m-bit blocks 21–36 connected as a first shift register, where each block 21–36 has an input and an output. In the preferred embodiment, n is 16 and m is either 1 or 2. If m is 1, the device 20 produces a 256-bit hash value. If m is 2, the device 20 generates a 512-bit hash value.

A first function block $\sigma_0(x)$ 37, having an input and an output, has its input connected to the output of a user-definable 32m-bit block in the first shift register. In the preferred embodiment, the input of the first function block $\sigma_0(x)$ 37 is connected to the next to last 32m-bit block 35 in the first shift register. The function of the first function block $\sigma_0(x)$ 37 is as follows:

$$\sigma_0(x) = S^7(x) \oplus S^{18}(x) \oplus R^3(x), \text{ if } m=1;$$

$$\sigma_0(x) = S^1(x) \oplus S^8(x) \oplus R^7(x), \text{ if } m=2;$$

where $S^i(x)$ is a right rotation of x by i bits; and where $R^i(x)$ is a right shift of x by i bits.

A second function block a $\sigma_1(x)$ 38 has an input connected to the output of a user-definable 32m-bit block in the first shift register, and has an output. In the preferred embodiment, the input of the second function block a $\sigma_1(x)$ 38 is connected to the second 32m-bit block 22 in the first shift register. The function of the second function block $\sigma_1(x)$ 38 is as follows:

$$\sigma_0(x) = S^{17}(x) \oplus S^{19}(x) \oplus R^{10}(x), \text{ if } m=1; \text{ and}$$

$$\sigma_0(x) = S^{19}(x) \oplus S^{61}(x) \oplus R^6(x), \text{ if } m=2.$$

A first logic block 39 has a first input connected to the output of the 32m-bit block 36 that is last in the first shift register, has a second input connected to the output of the first function block $\sigma_0(x)$ 37, and has an output. Each logic block of the present invention is selected from the group of logic functions consisting of XOR, AND, OR, NOT, NAND, and NOR. In the preferred embodiment, each of the logic blocks are XOR. However, the logic blocks do not all have to be the same logic function.

A second logic block 40 has a first input connected to the output of a user-definable 32m-bit block in the first shift register, has a second input connected to the output of the first logic block 39, and has an output. In the preferred embodiment, the first input is connected to the output of the seventh 32m-bit block 27 in the first shift register.

A third logic block 41 has a first input connected to the output of the second logic block 40, has a second input connected to the output of the second function block $\sigma_1(x)$ 38, and has an output connected to the input of the 32m-bit block 21 that is first in the first shift register.

A fourth logic block 42 has a first input connected to the output of the 32m-bit block 36 that is last in the first shift register, has a second input for receiving a user-definable key value, and has an output. The user-definable key value may be fixed to a constant or may be changed as often as the user desires.

The device 20 includes p 32m-bit blocks (43–50 in FIG. 2) connected as a second shift register, where each block has an input and an output. In the preferred embodiment, p is 8. In addition, a fifth logic block 51, having a first input, a second input, and an output, is included in the second shift register between two of the p 32m-bit blocks 43–50. In the preferred embodiment, the first input of the fifth logic block 51 is connected to the output of the fourth 32m-bit block 46, and the second input of the fifth logic block 51 is connected to the input of the fifth 32m-bit block 47.

An accumulator 52 has inputs connected to corresponding outputs of the 32m-bit blocks 43–50 in the second shift register, and has an output at which the generated hash value appears. The accumulator 52 saves the current state of the second shift register and adds this value to subsequent states of the second shift register produced by stepping the first and second shift registers a user-definable number of times. The last value stored in the accumulator is the hash value generated by the device 20 and appears at the output of the accumulator 52.

A third function block $\Sigma_0(x)$ 53, has an input connected to the output of the 32m-bit block 43 that is first in the second shift register, has an output, and performs the following function:

$$\Sigma_0(x) = S^2(x) \oplus S^{13}(x) \oplus S^{22}(x) \text{ for } m=1; \text{ and}$$

$$\Sigma_0(x) = S^{28}(x) \oplus S^{34}(x) \oplus S^{39}(x) \text{ for } m=2.$$

A fourth function block $\Sigma_1(x)$ 54, has an input connected to a user-definable output of the 32m-bit block, has an output, and performs the following function:

$$\Sigma_1(x) = S^6(x) \oplus S^{11}(x) \oplus S^{25}(x) \text{ if } m=1; \text{ and}$$

$$\Sigma_1(x) = S^{14}(x) \oplus S^{18}(x) \oplus S^{41}(x) \text{ if } m=2.$$

In the preferred embodiment, the input of the fourth function block $\Sigma_1(x)$ 54 is connected to the output of the fifth 32m-bit block 47.

A fifth function block Maj(x) 55 has at least one input connected to at least one output of a user-definable 32m-bit blocks in the second shift register and has an output. In the preferred embodiment, the fifth function block Maj(x) 55 has three inputs connected to the outputs of the first, second, and third 32m-bit blocks 43–45 in the second shift register, and performs the following function:

$$Maj(a,b,c) = (a\char`\^b) \oplus (a\char`\^c) \oplus (b\char`\^c).$$

A sixth function block Ch(x) 56 has at least one input connected to at least one output of a user-definable 32m-bit blocks in the second shift register and has an output. In the preferred embodiment, the sixth function block Ch(x) 56 has three inputs connected to the outputs of the fifth, sixth, and seventh 32m-bit blocks 47–49 in the second shift register, and performs the following function:

$$Ch(e,f,g) = (e\char`\^f) \oplus (\neg e\char`\^g).$$

A sixth logic block 57 has a first input connected to the output of the 32m-bit block 50 that is last in the second shift register, has a second input connected to the output of the sixth function block Ch(x) 56, has a third input connected to the output of the fourth logic block, and has an output.

A seventh logic block 58 has a first input connected to the output of the sixth logic block, has a second input connected to the output of the fourth function block $\Sigma_1(x)$ 54, and has an output connected to the second input of the fifth logic block 51.

An eighth logic block 59 has a first input connected to the output of the fifth function block Maj(x) 55, has a second input connected to the output of the third function block $\Sigma_0(x)$ 53, and has an output.

A ninth logic block 60 has a first input connected to the output of the eighth logic block 59, has a second input connected to the output of the seventh logic block 58, and has an output connected to the input of the 32m-bit block 43 that is first in the second shift register.

What is claimed is:

1. A method of generating a hash value for a message of length l, comprising the steps of:
   a) padding the message to a length of 512m bits, where m is a user-definable positive integer;
   b) parsing the result of step (a) into 16 32m-bit blocks $M_n$;
   c) generating j values $W_j$ from the result of step (b) according to the following equations:

$W_j = M_j$ for $j=0,1,\ldots,15$; and $W_j = \sigma_1(W_{j-2}) + W_{j-7} + \sigma_0(W_{j-15}) + W_{j-16}$ for $j=16,17,\ldots,j$, where j is a user-definable positive integer;
   where $\sigma_1(x) = S^{17}(x) \oplus S^{19}(x) \oplus R^{10}(x)$, if m=1;
   where $\sigma_1(x) = S^{19}(x) \oplus S^{61}(x) \oplus R^6(x)$, if m=2;
   where + is addition mod $2^{32m}$;
   where $\oplus$ is bitwise XOR;
   where $\sigma_0(x) = S^7(x) \oplus S^{18}(x) \oplus R^3(x)$, if m=1;
   where $\sigma_0(x) = S^1(x) \oplus S^8(x) \oplus R^7(x)$, if m=2;
   where $S^i(x)$ is a right rotation of block x by i bits, leaving block x unchanged afterwards; and
   where $R^i(x)$ is a right shift of block x by i bits, leaving block x unchanged afterwards;
   d) initializing a, b, c, d, e, f, g, and h with user-definable values $H_1, H_2, H_3, H_4, H_5, H_6, H_7$, and $H_8$, respectively;
   e) converting a, b, c, d, e, f, g, and h as follows:

$h_j = g_{j-1}$;

$g_j = f_{j-1}$;

$f_j = e_{j-1}$;

$e_j = d_{j-1} + T_1$, where $T_1 = h_{j-1} + \Sigma_1(e_{j-1}) + Ch(e_{j-1}, f_{j-1}, g_{j-1}) + K_j + W_j$, where $\Sigma_1(e_{j-1}) = S^6(e_{j-1}) \oplus S^{11}(e_{j-1}) \oplus S^{25}(e_{j-1})$ if m=1;
   where $\Sigma_1(e_{j-1}) = S^{14}(e_{j-1}) \oplus S^{18}(e_{j-1}) \oplus S^{41}(e_{j-1})$ if m=2;
   where $Ch(e_{j-1}, f_{j-1}, g_{j-1}) = (e_{j-1} \char`\^ f_{j-1}) \oplus (\neg e_{j-1} \char`\^ g_{j-1})$;
   where $K_j$ is at least one key;
   where ^ is bitwise AND,
   and where ¬ is bitwise complement;

$d_j = c_{j-1}$;

$c_j = b_{j-1}$;

$b_j = a_{j-1}$; and $a_j = T_1 + T_2$, where $T_2 = \Sigma_0(a_{j-1}) + Maj(a_{j-1}, b_{j-1}, c_{j-1})$;

where $\Sigma_0(a_{j-1}) = S^2(a_{j-1}) \oplus S^{13}(a_{j-1}) \oplus S^{22}(a_{j-1})$ for m=1;
   where $\Sigma_0(a_{j-1}) = S^{28}(a_{j-1}) \oplus S^{34}(a_{j-1}) \oplus S^{39}(a_{j-1})$ for m=2;
   and where $Maj(a_{j-1}, b_{j-1}, c_{j-1}) = (a_{j-1} \char`\^ b_{j-1}) \oplus (a_{j-1} \char`\^ c_{j-1}) \oplus (b_{j-1} \char`\^ c_{j-1})$;
   f) computing values as follows:

$H_1(j) = a + H_1(j-1)$;

$H_2(j) = b + H_2(j-1)$;

$H_3(j) = c + H_3(j-1)$;

$H_4(j) = d + H_4(j-1)$;

$H_5(j) = e + H_5(j-1)$;

$H_6(j) = f + H_6(j-1)$;

$H_7(j) = g + H_7(j-1)$; and $H_8(j) = h + H_8(j-1)$; and g) returning to step (f) if additional processing is desired, otherwise, returning at least 161 bits of $(H_1(j), H_2(j), H_3(j), H_4(j), H_5(j), H_6(j), H_7(j), H_8(j))$ as the hash value of the message.

2. The method of claim 1, wherein said step of padding the message to a length of 512m bits is comprised of the step of appending a 1 bit to the message along with k zero bits, where k is the smallest non-negative solution to l+1+k= (448m) mod (512m).

3. The method of claim 1, wherein said step of padding the message to a length of 512m bits is comprised of the step of padding the message to a length of 512m bits, where m is 1.

4. The method of claim 3, wherein said step of generating j keys $W_j$ from the result of step (b) where j is 64.

5. A method of claim 1, wherein said step of padding the message to a length of 512m bits is comprised of the step of padding the message to a length of 512m bits, where m is 2.

6. The method of claim 5, wherein said step of generating j keys $W_j$ from the result of step (b) where j is 80.

7. A device for generating a hash value, comprising:
   a) n 32m-bit blocks connected as a first shift register, where n and m are user-definable positive integers, and where each 32m-bit block has an input and an output;
   b) a first function block $\sigma_0(x)$ having an input and an output, where the input is connected to the output of a user-definable 32m-bit block in the first shift register;
   c) a second function block $\sigma_1(x)$ having an input and an output, where the input is connected to the output of a user-definable 32m-bit block in the first shift register;
   d) a first logic block, having a first input connected to the output of the 32m-bit block that is last in the first shift register, having a second input connected to the output of the first function block $\sigma_0(x)$, and having an output;
   e) a second logic block, having a first input connected to the output of a user-definable 32m-bit block in the first shift register, having a second input connected to the output of the first logic block, and having an output;
   f) a third logic block, having a first input connected to the output of the second logic block, having a second input connected to the output of the second function block $\sigma_1(x)$, and having an output connected to the input of the 32m-bit block that is first in the first shift register;
   g) a fourth logic block, having a first input connected to the output of the 32m-bit block that is last in the first shift register, a second input for receiving a user-definable key value, and an output;
   h) a fifth logic block, having a first input, having a second input, and having an output;
   i) p 32m-bit blocks connected as a second shift register, where the first input and the output of the fifth logic block are placed between the input and the output of two user-definable 32m-bit blocks in the second shift register, where p is a user-definable positive integer, and where each 32m-bit block in the second shift register has an input and an output;
   j) an accumulator having a plurality of inputs connected to the outputs of each 32m-bit block in the second shift register, and having an output;

k) a third function block $\Sigma_0(x)$, having an input connected to the output of the 32m-bit block that is first in the second shift register, and having an output;

l) a fourth function block $\Sigma_1(x)$, having an input connected to the output of a user-definable 32m-bit block in the second shift register, and having an output;

m) a fifth function block Maj(x), having at least one input connected to at least one output of a user-definable 32m-bit blocks in the second shift register, and having an output;

n) a sixth function block Ch(x), having at least one input connected to at least one output of a user-definable 32m-bit blocks in the second shift register, and having an output;

o) a sixth logic block, having a first input connected to the output of the 32m-bit block that is last in the second shift register, having a second input connected to the output of the sixth function block Ch(x), having a third input connected to the output of the fourth logic block, and having an output;

p) a seventh logic block, having a first input connected to the output of the sixth logic block, having a second input connected to the output of the fourth function block $\Sigma_1(x)$, and having an output connected to the second input of the fifth logic block;

q) an eighth logic block, having a first input connected to the output of the fifth function block Maj(x), having a second input connected to the output of the third function block $\Sigma_0(x)$, and having an output; and r) a ninth logic block, having a first input connected to the output of the eighth logic block, having a second input connected to the output of the seventh logic block, and having an output connected to the input of the 32m-bit block that is first in the second shift register.

8. The device of claim 7, wherein said n 32m-bit blocks connected as a first shift register, are comprised of 16 32m-bit blocks connected as a first shift register, where each 32m-bit block has an input and an output.

9. The device of claim 8, wherein each of said 16 32m-bit blocks are comprised of a 32m-bit block where m is selected from the group of numbers consisting of 1 and 2.

10. The device of claim 9, wherein the input of said first function block $\sigma_0(x)$ is connected to the output of a 32m-bit block $W_{j-15}$ that is next to last in the first shift register, and where $\sigma_0(x)=S^7(x)\oplus S^{18}(x)\oplus R^3(x)$, if m=1;

where $\sigma_0(x)=S^1(x)\oplus S^8(x)\oplus R^7(x)$, if m=2;

where $S^i(x)$ is a right rotation of x by i bits; and where $R^i(x)$ is a right shift of x by i bits.

11. The device of claim 10, wherein the input of said second function block $\sigma_1(x)$ is connected to the output of the second 32m-bit block $W_{j-2}$ in the first shift register, and where $\sigma_1(x)=S^{17}(x)\oplus S^{19}(x)\oplus R^{10}(x)$, if m=1; and where $\sigma_1(x)=S^{19}(x)\oplus S^{61}(x)\oplus R^6(x)$, if m=2.

12. The device of claim 11, wherein each of said first logic block, said second logic block, said third logic block, said fourth logic block, said fifth logic block, said sixth logic block, said seventh logic block, said eighth logic block, and said ninth logic block are each selected from the group of logic functions consisting of XOR, AND, OR, NOT, NAND, and NOR.

13. The device of claim 12, wherein the first input of said second logic block is connected to the output of the seventh 32m-bit block in the first shift register.

14. The device of claim 13, wherein said p 32m-bit blocks are comprised of eight 32m-bit blocks connected as a second shift register.

15. The device of claim 14, wherein the first input of said fifth logic block is connected to the output of the fourth 32m-bit block in the second shift register, and where the output of the fifth logic block is connected to the input of the fifth 32m-bit block in the second shift register.

16. The device of claim 15, wherein said third function block $\Sigma_0(x)$ is comprised of $\Sigma_0(x)=S^2(x)\oplus S^{13}(x)\oplus S^{22}(x)$ for $m=1$; and $\Sigma_0(x)=S^{28}(x)\oplus S^{34}(x)\oplus S^{39}(x)$ for $m=2$.

17. The device of claim 16, wherein said fourth function block $\Sigma_1(x)$ is connected to the fifth 32m-bit block in the second shift register is comprised of $\Sigma_1(x)=S^6(x)\oplus S^{11}(x)\oplus S^{25}(x)$ if $m=1$; and $\Sigma_1(x)=S^{14}(x)\oplus S^{18}(x)\oplus S^{41}(x)$ if $m=2$.

18. The device of claim 17, wherein said fifth function block Maj(x) is comprised of $Maj(a,b,c)=(a\char`\^b)\oplus(a\char`\^c)\oplus(b\char`\^c)$.

19. The device of claim 18, wherein said sixth function block Ch(x) is comprised of $Ch(e,f,g)=(e\char`\^f)\oplus(\neg e\char`\^g)$.

* * * * *